US007770540B2

(12) United States Patent  
Halpern

(10) Patent No.: US 7,770,540 B2
(45) Date of Patent: Aug. 10, 2010

(54) EXERCISE AND PERCH SYSTEM FOR DOMESTIC CATS

(75) Inventor: Eric Lee Halpern, Wayne, PA (US)

(73) Assignee: DesignWerks, Inc., Wayne, PA (US)

(*) Notice: Subject to any disclaimer, the term of this patent is extended or adjusted under 35 U.S.C. 154(b) by 504 days.

(21) Appl. No.: 11/643,173

(22) Filed: Dec. 21, 2006

(65) Prior Publication Data

US 2008/0149042 A1  Jun. 26, 2008

(51) Int. Cl.
*A01K 29/00* (2006.01)
(52) U.S. Cl. ...................................... 119/706
(58) Field of Classification Search ................ 119/706, 119/28.5; D30/160
See application file for complete search history.

(56) References Cited

U.S. PATENT DOCUMENTS

| 554,661 | A | * | 2/1896 | Doolittle | 108/105 |
|---|---|---|---|---|---|
| D32,288 | S | * | 2/1900 | Stone | D6/405 |
| 2,143,592 | A | * | 1/1939 | Baldeck | 211/134 |
| 3,479,990 | A | * | 11/1969 | Crow | 119/28.5 |
| 3,479,991 | A | * | 11/1969 | Lichtenberger | 119/28.5 |
| 3,595,209 | A | * | 7/1971 | Parker | 119/706 |
| 3,604,397 | A | * | 9/1971 | Salerno | 119/706 |
| D222,276 | S | * | 10/1971 | Hughes | D30/160 |
| D233,844 | S | * | 12/1974 | Tucker | D30/160 |
| 4,068,761 | A | * | 1/1978 | McCarthy | 211/134 |
| 4,127,141 | A | * | 11/1978 | Ledonne et al. | 137/15.15 |
| 4,177,763 | A | * | 12/1979 | Cook | 119/706 |
| 4,253,423 | A |  | 3/1981 | Kaplan |  |
| 4,511,607 | A | * | 4/1985 | White | 428/13 |
| D355,057 | S |  | 1/1995 | Northrop |  |
| 5,577,466 | A | * | 11/1996 | Luxford | 119/706 |
| 5,829,390 | A | * | 11/1998 | Jonilla et al. | 119/706 |
| 5,875,735 | A | * | 3/1999 | Bradley et al. | 119/706 |
| 6,360,692 | B2 | * | 3/2002 | Gear | 119/706 |
| D461,026 | S |  | 7/2002 | Mason |  |
| 6,490,997 | B1 | * | 12/2002 | Biermann et al. | 119/706 |
| D473,020 | S |  | 4/2003 | DeRaspe-Bolles |  |
| 7,040,053 | B1 | * | 5/2006 | Beesley | 47/39 |
| D545,007 | S | * | 6/2007 | Northrop | D30/160 |
| 2003/0221628 | A1 | * | 12/2003 | Leon | 119/28.5 |
| 2007/0289209 | A1 | * | 12/2007 | Hager | 47/39 |

* cited by examiner

Primary Examiner—Yvonne R. Abbott

(57) ABSTRACT

A collapsible and scaleable floor to ceiling post forming an exercise and perch system for domestic cats. Using integral platforms (37,44) that function as steps and perching areas (35). The post may be adjusted to different ceiling heights by adding or removing interchangeable sections (41,44) and provides fine adjustment with a telescopic section that is spring biased (28) to limit forces on the ceiling. The step/platforms are rotationally spaced by 120 degrees for an optimal rise to run ratio resulting in climbing comfort, ascend and descend speed, safety, and contemporary appearance. The post has a cross-section that forces step and loft mounting at 120° intervals using multiples of three cross-sectional facets. The assembly provides for a removable scratching area near the bottom of the post and padded perch area nearest the ceiling.

15 Claims, 15 Drawing Sheets

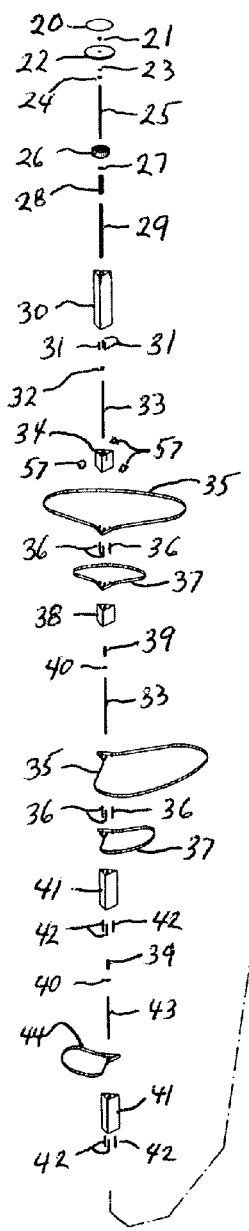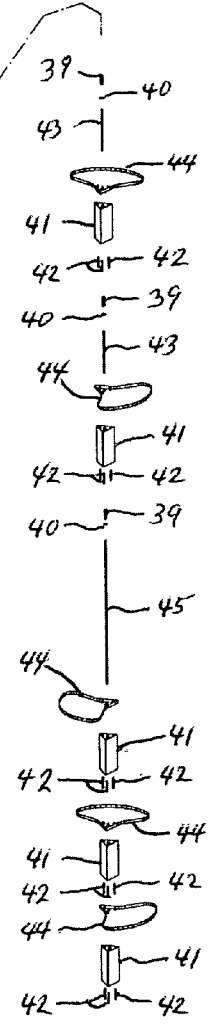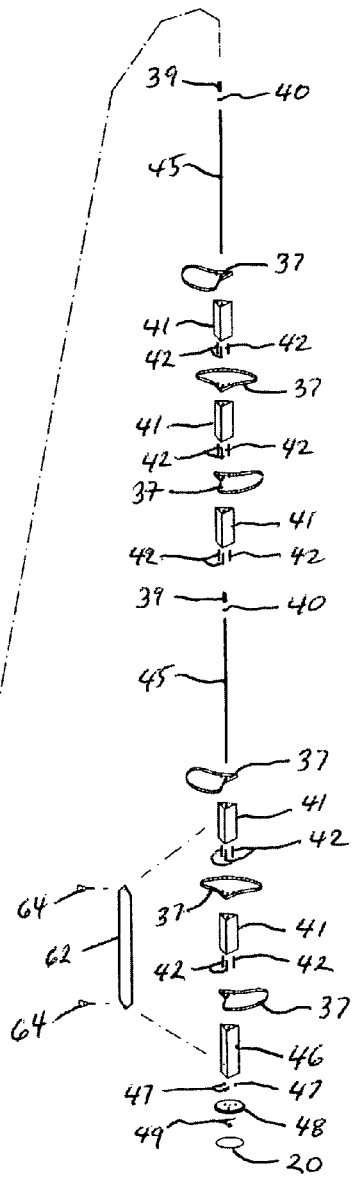
Fig. 2

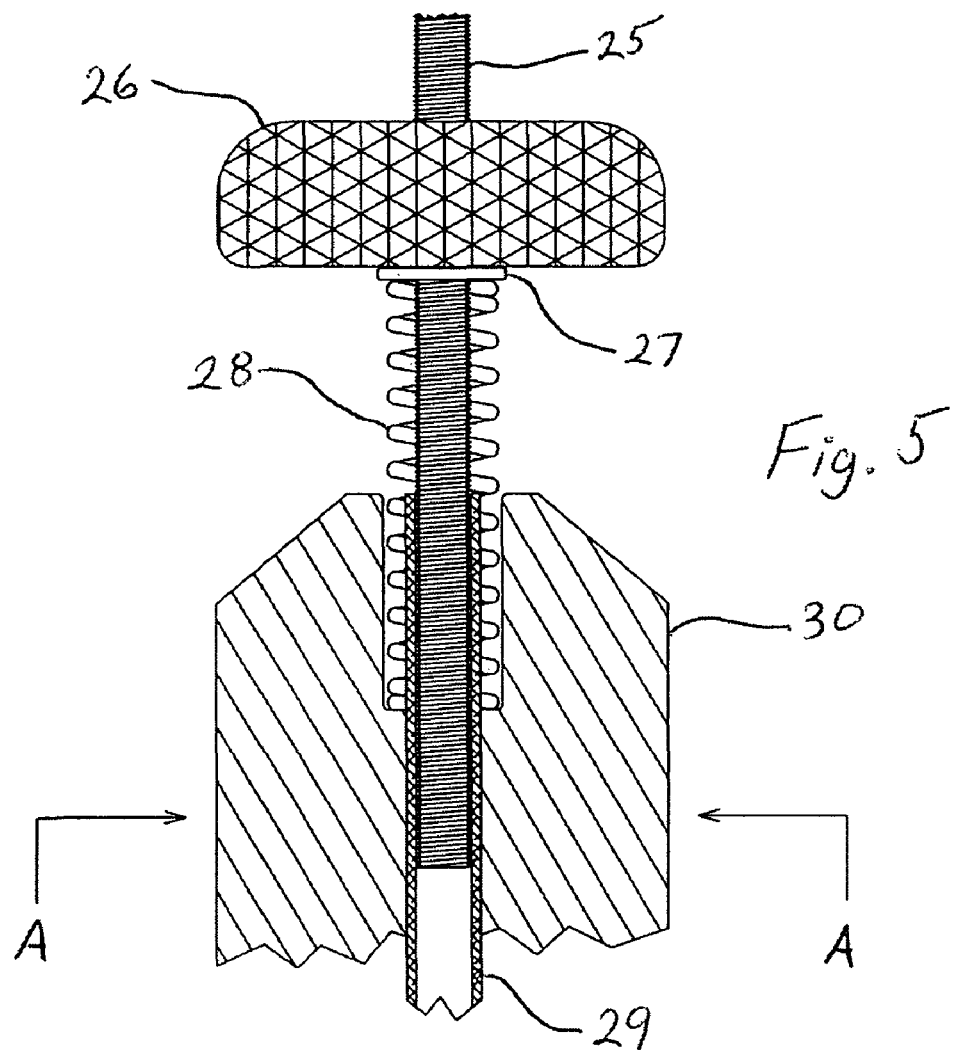
Fig. 5
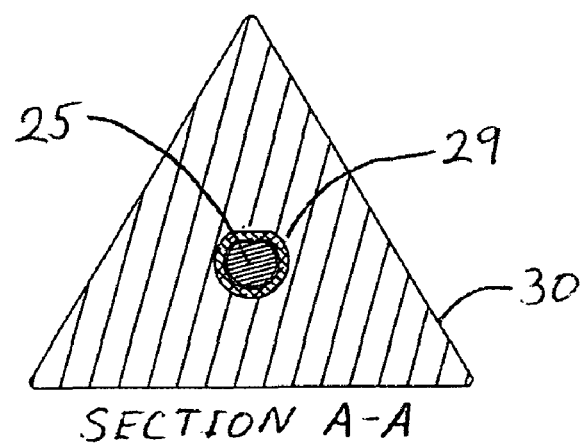
SECTION A-A

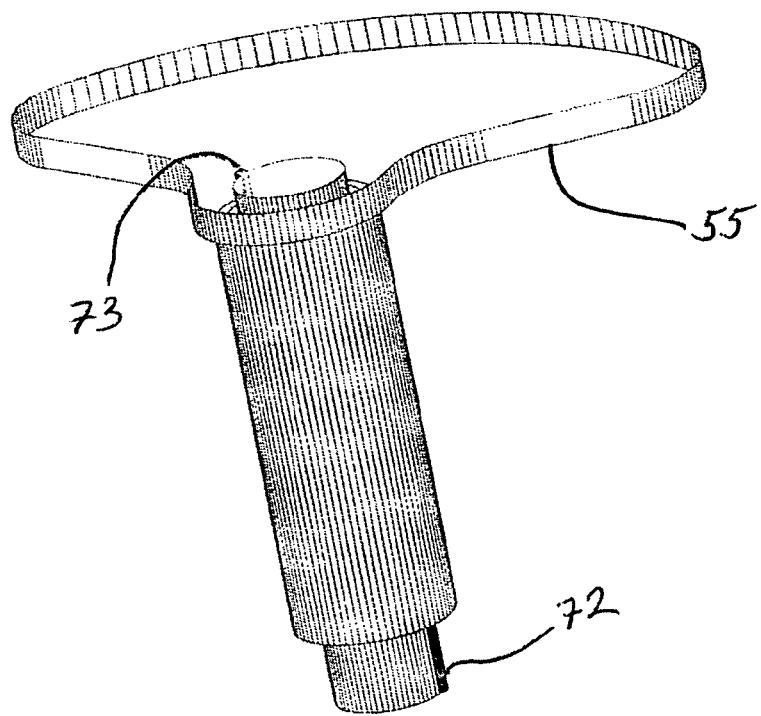
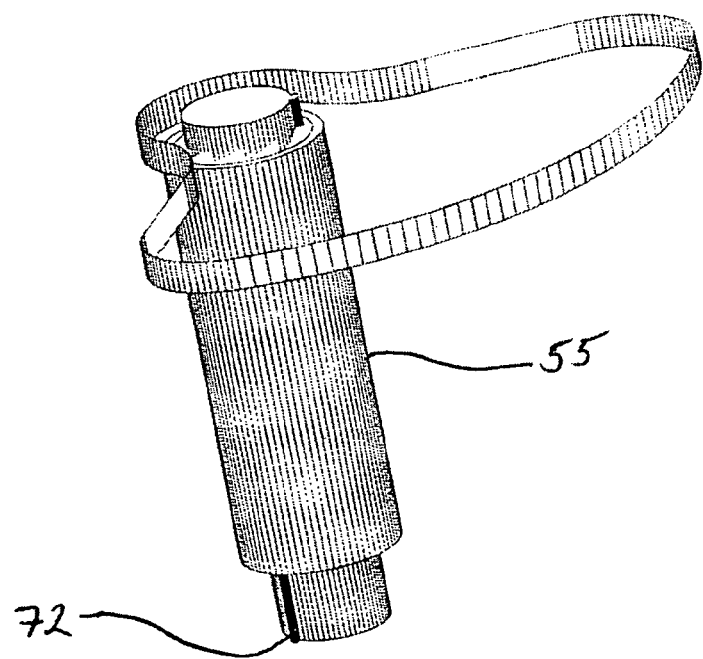
Fig. 13

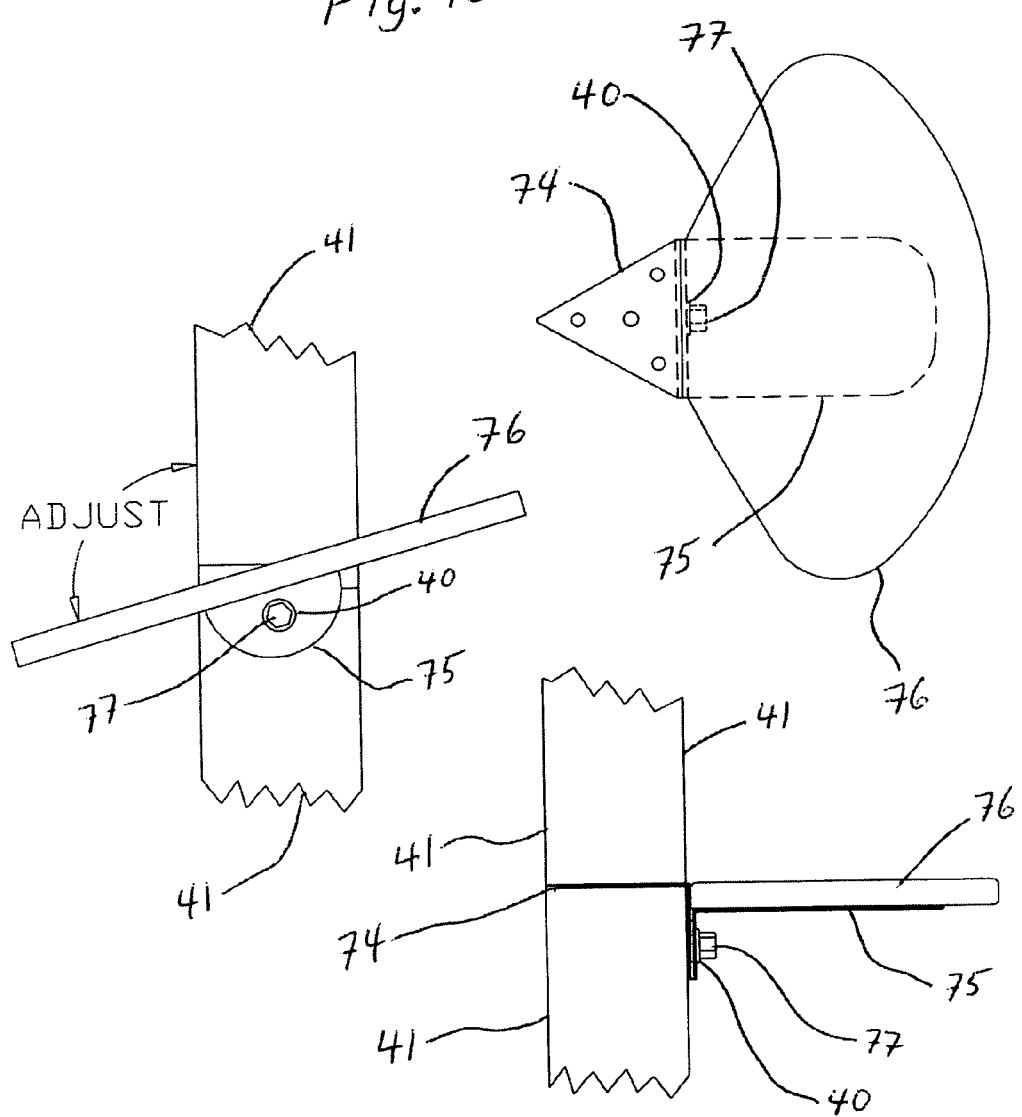

EXERCISE AND PERCH SYSTEM FOR DOMESTIC CATS

BACKGROUND

1. Field of Invention

Domestic cats seek perch areas that are highest in order to maintain a sense of security, comfort and stalking advantage. Cats also require surfaces for exercise of their claws and for climbing. Older cats, or those without claws are limited in their climbing ability, but also need an apparatus that provides a challenging climbing experience with stalking advantage. The present invention seeks to address the need for an easily assembled and installed rigid columnar spring tensioned floor to ceiling support structure that can be readily adapted to provide an attractive cat climbing exercise and loft system utilizing a minimum of floor space in the home.

In a preferred embodiment the novel structure of the invention forms a lightweight collapsible segmented rigid center support column incorporating radial stair treads spaced at intervals along the column to form a spiral staircase having a spring assembly at one end for compressive mounting between floor and ceiling. The device is scaleable for varying floor to ceiling heights and location anywhere in a room, providing loft space nearest the ceiling, made in relatively small component parts that can be easily assembled and disassembled and offering compact retail packaging and ease of assembly. These and other objectives of the invention will be more fully understood from the detailed description and drawings.

2. Description of Prior Art

The exercise and perch systems common in the art generally require a large footprint in order to stabilize them and provide safety from falling over. Other prior art structures fail to provide the rigidity and stability for locating the larger functional elements needed to provide perching or resting space near the top with smaller elements near the bottom to minimize floor space.

Among such prior art devices the most basic exercise and scratch device is exemplified by that shown in U.S. Pat. No. 4,253,423 to Kaplan (1981) which consists of a short square post covered by tightly wound rope. This device requires a large base to stabilize a short scratching column in order to balance the weight of the cat and its scratching force and lacks the climbing and elevated perch areas.

U.S. Pat. No. D 355,057 to Northrop (1995) provides a wider base and tapered pole which is also wider at the base to give increased stability during scratching but doesn't provide scalability, climbing or perching and still requires a large floor footprint.

Other designs known in the art take advantage of the spiral staircase concept, but consume inordinate floor space for their height and lack the center core supporting structure giving both vertical and horizontal rigidity and stability needed for high elevation perching. For example, U.S. Pat. No. D 473,020 to DeRaspe-Bolles et al. (2003), and U.S. Pat. No. 6,490,997 to Biermann et al. (2002) use short designs which also narrow as they become taller and provide insufficient resting area at the top. Their limited height fails to satisfy the cat's need for maximum stalking advantage.

Still other known designs provide floor to ceiling climb and perch but suffer significant disadvantages compared to the structure of the present invention. For example;

U.S. Pat. No. D 461,026 to Mason (2002) utilizes a cage-like structure with outer stair tread supports to provide stability requiring a constant diameter the entire length which doesn't allow for minimizing required floor space or ease of assembly and disassembly.

U.S. Pat. No. 3,479,990 to Crow (1969) also shows consistent outside diameter and floor space requirement from floor to ceiling without any of the present invention's means for providing center core vertical and horizontal stability and strength to prevent excessive movement when cats spring from one area to the next. Crow's design takes advantage of being spring biased to the ceiling, but negates the effectiveness of the spring to compensate for fluctuations in floor to ceiling distance owing to changes in materials caused by humidity and the like.

U.S. Pat. No. 3,479,991 to Lichtenberger (1969) like Crow lacks center core stabilizing elements held rigid by compression to minimize movement of the stair treads under loading and unloading. Lichtenberger's device is adjusted in place by the jack screw at the bottom but lacks a spring element to automatically accommodate changes in floor and ceiling distance with changing conditions.

U.S. Pat. No. D 233,844 to Littleton (1974) consumes excessive space by using relatively large rectangular steps at 90° intervals and like the others fails to provide any means for creating center pole stability and rigidity as provided by the central rod of the current device which ties together the multiplicity of column segments (spacers and stair treads) to provide a vertically and horizontally stable rigid structure.

U.S. Pat. No. 3,595,209 to Parker (1971) like Crow, Littleton and Lichtenberger lacks the central compression rod element of the present invention, rather utilizing single round dowels and sockets to join sections failing to stop accidental rotation of steps and lacks a large rest area near the top.

U.S. Pat. No. 3,604,397 to Salerno (1971) provides a floor to ceiling column with just a single shelf midway up the entirely carpeted column. This device seems intended exclusively for cats with claws since it lacks additional steps and forces the cat to jump or claw its way to the perch area. There is no suggestion of a segmented column under compression independent of the tensioning spring holding the column in place between floor and ceiling U.S. Pat. No. 5,829,390 to Jonilla, et al. (1998) relies on fastening to a wall or doorframe for stability and is therefore not readily relocatable to anywhere in a room Other structures known in the art such as one sold by Precision Pine Inc. of Knoxville, Tenn. (http://www.catspiral.com) uses vertical spacers but lacks a central compression rod to provide vertical and horizontal stability for the steps and perch. Nor does the Precision Pine structure and similar devices provide the automatic adjustment for temporary changes in floor to ceiling distance. Moreover there is nothing to suggest the rotationally indexed steps forming a spiral staircase of the present invention or the spring biased jack screw assembly for easy insertion of the structure anywhere in the room As distinguished from the prior art structures the present invention provides a unique versatile climbing, scratching, exercise and resting device for pet cats that is comprised of relatively small component parts that are conveniently packaged in a compact space and readily assembled to form a sturdy, attractive floor to ceiling structure that is alluring to cats encouraging them to exercise by appealing to their instinct to scratch, climb and stalk in a manner that is safe for the cat and the surroundings utilizing minimum floor space with greater utilization of higher spaces.

SUMMARY OF THE INVENTION

The novel structure of this invention provides a rigid segmented core column capable of supporting a variety of radially extending multipurpose appendages for removable insertion between fixed opposing surfaces which in one preferred embodiment constitutes a spiral staircase with elevated loft area and detachable scratch surfaces as an exercise and resting area for pet cats. In a particularly preferred embodiment the use of semicircular radial steps that each encompass a 120 degree arc spaced at intervals along the column to provide a longer curved walking track area allowing for faster and safer ascent and descent for clawed and clawless cats by providing a uniform path for each. The use of steps having a varying radius of small at the bottom and increasing as the height increases allows setup nearer to furnishings on the floor, provides more floor space for occupants of the home to move about, and provides added safety for the pet as the height increases. An axial core rod assembly optionally also segmented independently provides compressive force on the column components for increased structural stability when in use. Provision is made for accessory scaling kits composed of additional spacers, treads, and core rod segment, that allow for installing the device in rooms with varying ceiling heights. The use of a spring biased adjuster mechanism protects the ceiling and accommodates changes in floor to ceiling distance while in place owing to such things as floor and ceiling materials, temperature and humidity and materials of construction.

Objects and Advantages

Accordingly, in addition to the advantages of the semicircular steps that increase in radius as the height becomes significant, large resting area, and active adjustment described above, several objects and advantages of the present invention are:

a. A strong central core columnar structure composed of multiple spacer elements and one or more functional elements with an axial rod assembly providing rigidity by means of fastener means securing the Rod assembly to the terminal ends of the terminal spacer elements comprising the column or separately columnar sections with a segmented axial rod.

b. A base plate assembly attached to one end of the column for mating with the floor and an independent jack screw spring assembly with an appropriate flat surface plate for mating with the ceiling to allow for compressive insertion between floor and ceiling and automatic spring adjustment for in-use variability.

c. Structural integrity and rigidity imparted to the segmented column provided by the compressive force asserted on the column main body of the by the axial rod assembly independent of any ancillary compressive force contributed by the jack screw spring assembly once the entire structure is compressively inserted between floor and ceiling.

d. Use of minimal clearance hole in the step and loft elements limits the ability of the compressive rod system to flex laterally and improves rigidity.

e. Use of an independent adjustment assembly like the spring biased jack screw system allows the infinite scaling of the base column. Joining the adjustment system using devices like cam-nuts with cam-dowels or screws in conjunction with pin and socket details maintains overall rigidity of the entire floor to ceiling system and allows for easy assembly or disassembly.

f. The use of cam-screws and cam-dowels to join columnar elements axially is unique and firmly maintains rotational alignment. This type of hardware is routinely used to join sheets of wood in right angle connections, but not in an axial mode for columnar assembly.

g. Minimal footprint on floor making cleaning easier, providing a minimalist appearance, and allowing more floor space for occupant movement and furnishings h. The small lower steps provide a minimum track width for safe passage of all cats.

i. Increased step area for added safety as height increases.

j. An ergonomic rise to track run length ratio of approximately 7:9, using 120° intervals for step rotation in combination with "gingko" leaf like (semicircular) shape for appearance and improved ascent and descent efficiency. The rise is defined by the average vertical step to step distance and the track run length is defined by the center path used by a cat on the smallest steps.

k. Built-in indexing is achieved by using apex dowels or tab and socket details that makes correct assembly easier.

l. Modularity allowing the consumer to increase or decrease the height of the system by adding or removing sets of steps or lofts and spacers, dowels and couplerscrews to manage ceiling heights from 7 to more than 14 feet.

m. Use of high density plywood steps and perch area to provide optimal stiffness without increasing the weight or expense of the system. This material removes the need for branch-like supports. The preferred material is "Multiply Birch" plywood by Multiply Birch Plywood Company, Timberland, U.K. or generic versions often referred to as Findlandia or Russian Birch.

n. Multiply Birch or similar also simplifies manufacturing by eliminating grain direction strength issues that occur when using natural (non-engineered) solid wood in a cantilever manner.

o. Spring biased adjustment and compressing assembly firmly positions the post anywhere in a room. This feature automatically compensates for changes over time in floor material like carpet padding and protects the ceiling from excessive forces while providing stability.

p. Carpet pads on each step and loft to provide traction and comfort. These pads adhere to the tops of the steps and eliminate added material and labor costs associated with covering top, bottom and edges of the steps. Carpet pads that only cover the top of the step allows the edge of the step to show its natural detail.

q. Allows for a padded loft pillow covered with fabric or fleece and filled with memory foam or conventional padding. These pillows are attached to the loft with hook and loop fasteners for easy removal and machine washing.

r. Allows for replaceable scratching pad made of carpet or spiral wrapped cord attached to the near-floor spacer elements using thumb-screw hardware or notches at the end of the spacers to trap knotted or crimped cord ends.

s. Uses non-marring rubber pads for adhesion to floor and ceiling and lessens the need for fixed mounting hardware and eliminates rotation of entire device.

t. The sizing screw and its sleeve are "D" shaped to rotationally lock the ceiling disk and adjuster system to the column and thereby keeps the column, ceiling and base disks in the same orientation.

u. Uses dowels or tabs at apexes or regular intervals to improve lateral stiffness and provide inherent indexing at 120-degree intervals.

v. Use of coupler-screws manages material error tolerance of individual components for each section of threaded rod and compressively joins multiple elements into a rigid structure without the need to change threaded rod length.

w. Further objects and advantages of my invention will become apparent from a consideration of the drawings and ensuing descriptions.

These and other advantages as well as adapting the structure for purposes other than cat exercising and resting device and for multipurpose uses such as display shelving will be readily apparent to those skilled in the art.

DRAWING FIGURES

FIG. 2 shows an exploded view of the entire system with additional medium size steps added to accommodate higher ceilings.

FIG. 5 shows the "D" shaped threaded rod, "D" shaped sleeve and spring cavity/seat detail.

Figure 10:
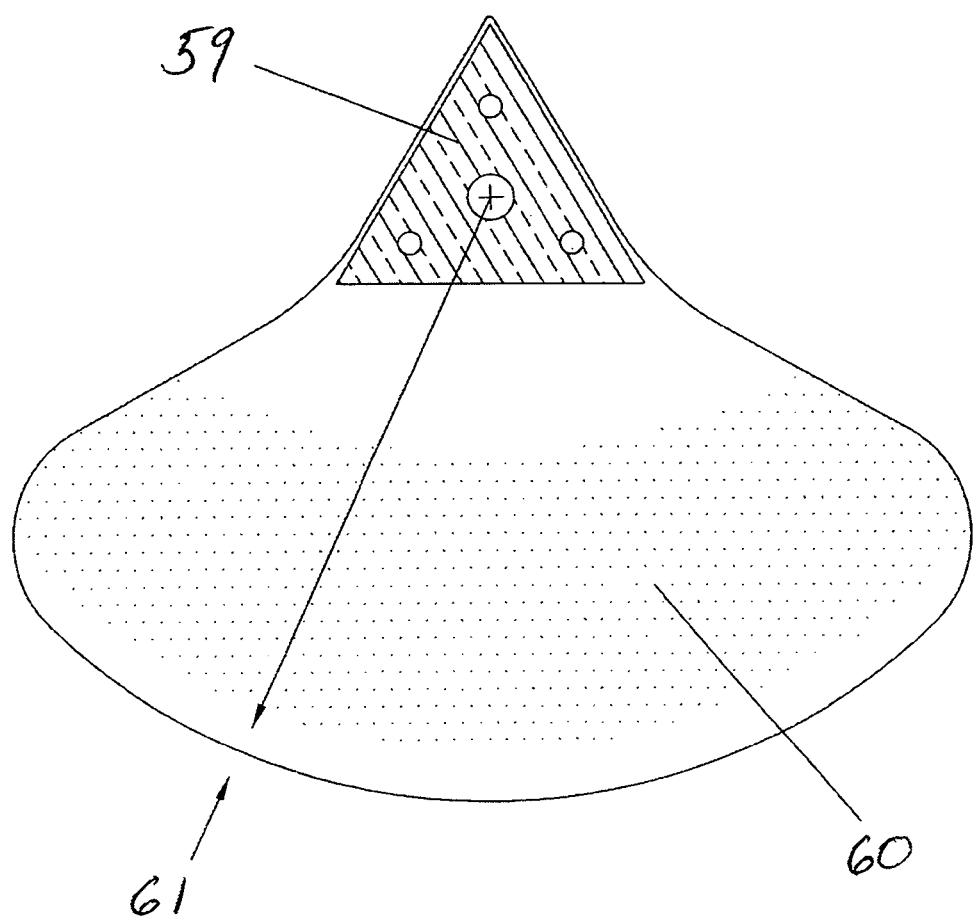

FIG. 10 defines the Hub Area, Step Radius and Curved Walking Track Area.

Figure 11:
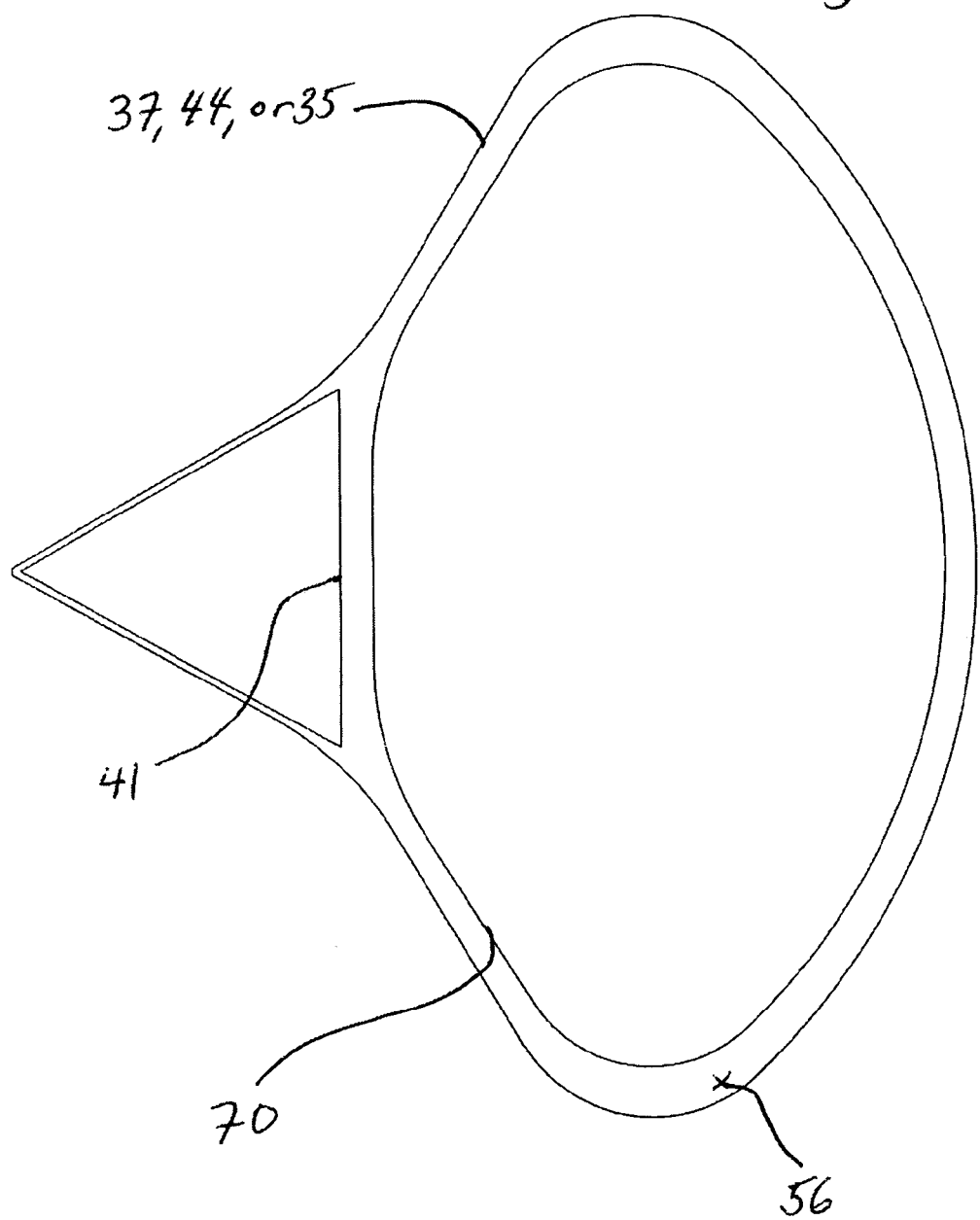

FIG. 11 Shows the shape of the carpet used on each step and loft.

Figure 12:
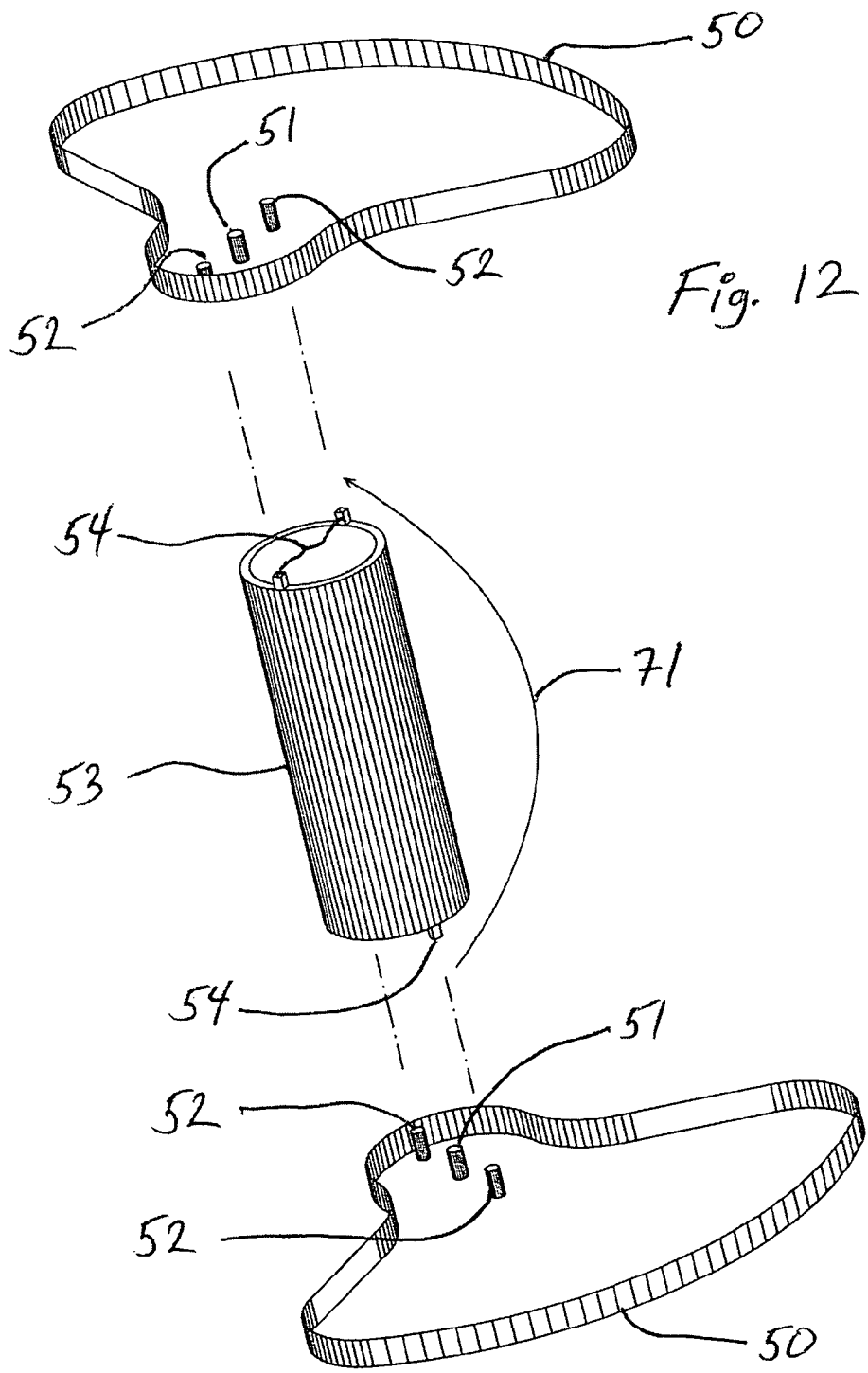

FIG. 12 shows an alternate embodiment where round or tri-polygonal (multiples of three sides) tubing is used as spacer material and index dowels are replaced by integral tab sockets created in the manufacture of the tubing and steps and lofts.

FIG. 13 shows an alternate embodiment where steps and the upright spacer (or tube material) are combined into a single composite element with keyed mating surfaces for automatic indexing and strength.

Figure 14:
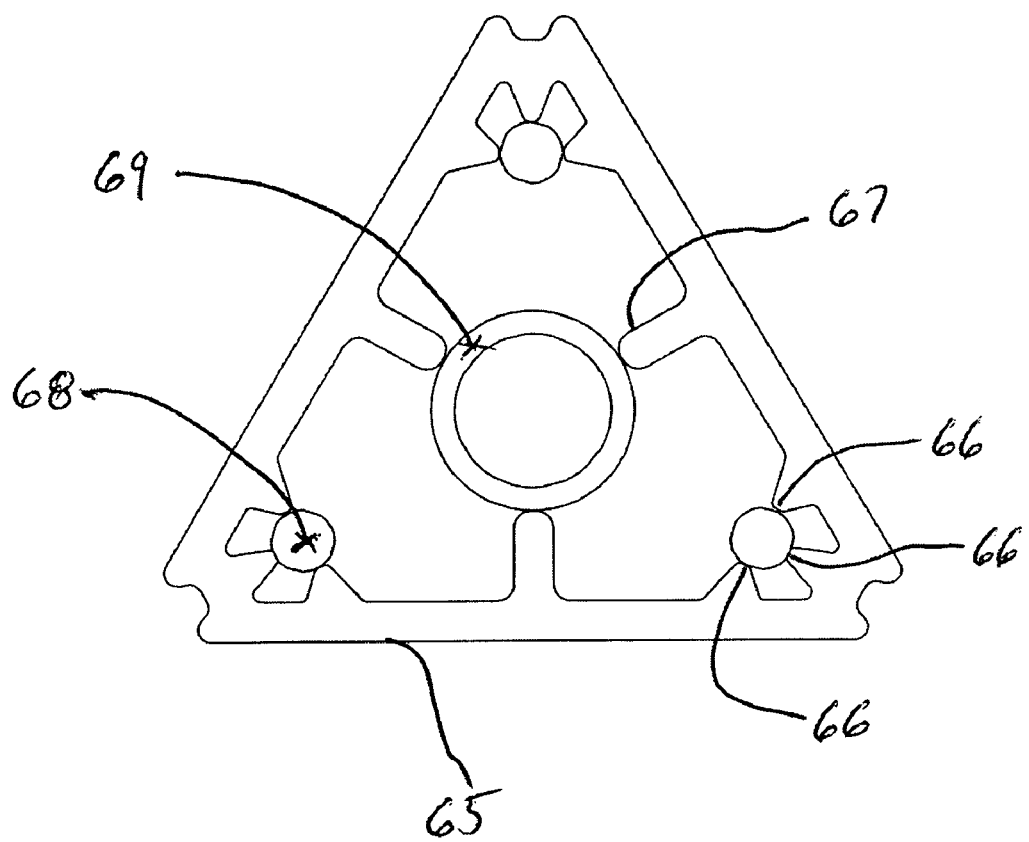

FIG. 14 shows an alternate embodiment where a hollow extrusion is used and provide apex dowel sockets and reinforcing ribs for lateral strength.

FIG. 15 shows an alternate embodiment where the steps are allowed to pivot using a pair of right angle plates. One horizontal plate face is compressed between the vertical spacers and the other horizontal plate face mounts the underside of a step. These vertical plate faces are attached with a fastener to form an adjustable pivot point.

REFERENCE NUMERALS IN DRAWINGS

20. Friction Pad
21. T-Nut (large)
22. Ceiling Disc
23. Shim
24. Lock Nut
25. Sizing Screw, "D" shape
26. Adjusting Knob
27. Washer
28. Spring
29. Sleeve, "D" Shape
30. Screw-Jack Housing
31. Cam Dowels
32. Cap Nut
33. Loft Rod
34. Stack Terminator
35. Loft
36. Index dowels (long)
37. Small Step
38. Loft Spacer
39. Coupler Nut
40. Lock Washer
41. Standard Spacer
42. Index Dowels (medium)
43. Medium Rod
44. Mid-Step
45. Long Rod
46. Base Spacer
47. Index Dowels (small)
48. Base Disc
49. T-Nut
50. Step with sockets for tabs
51. Hole for coupler-screw
52. Sockets for Tabs
53. Tube
54. Tabs
55. One Piece Step/Spacer
56. Exposed Edge
57. Cam Nuts
58. Wall surface-structure
59. Hub Area of step or loft
60. Curved Walking Track Area
61. Step or Loft Radius
62. Scratch Pad
63. Mounting Grommets
64. Thumb Screws
65. Extruded Spacer
66. Positioning Ribs
67. Anti-Flex Ribs
68. Integral Dowel Socket Area
69. Spring Holding Socket
70. Carpet
71. 120 Degree Rotation Tab
72. Key
73. Key-Way
74. Adjustable Step Mount
75. Adjustable Step Bracket
76. Adjustable Step
77. Pivot Fastener Description—FIG. 1-11—Preferred Embodiment A preferred embodiment of the invention in the form of a cat exercise and perch system is illustrated in FIGS. 1 through 11.

Figure 1:
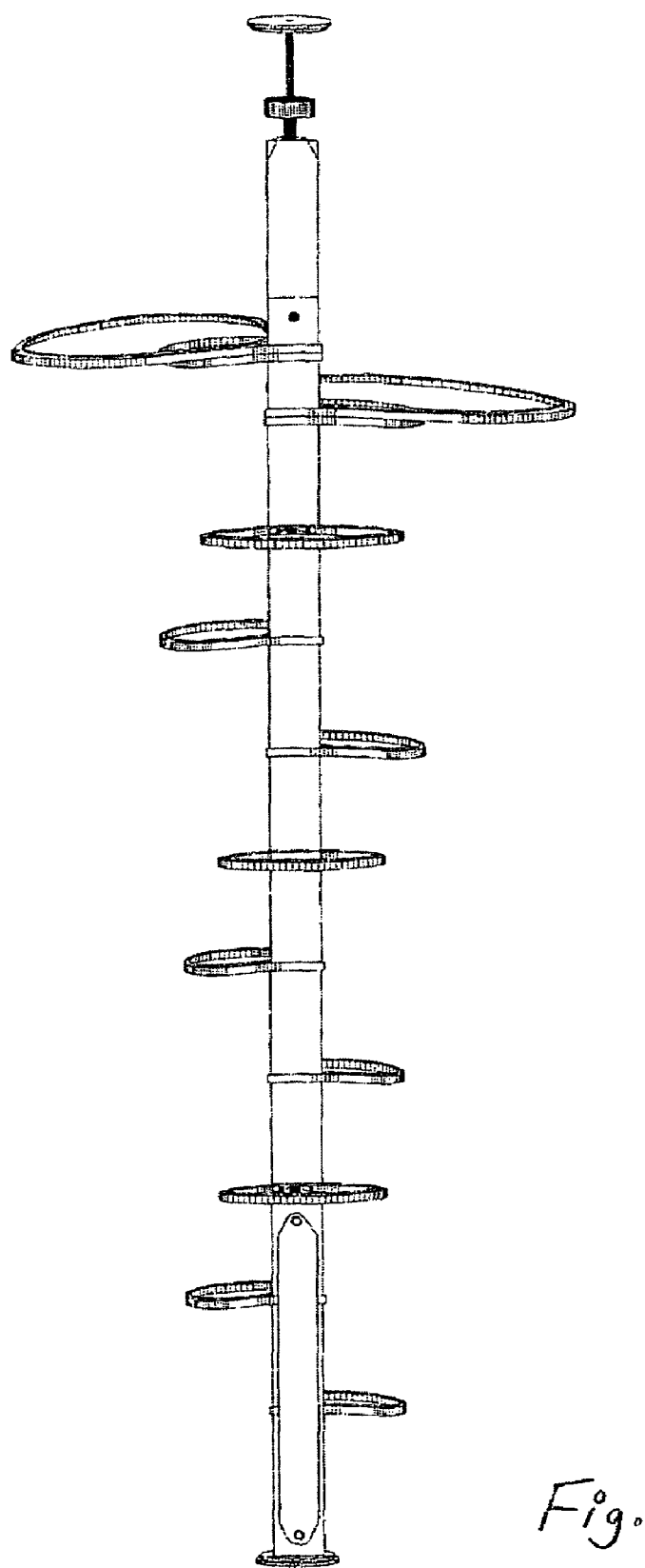
FIG. 1 shows the fully assembled post and loft system with two lofts viewed from the side.

FIG. 1 illustrates the entire system in a side view of a two loft version as seen by an occupant of the room.

FIG. 2 shows an exploded view of the entire system maximized with two lofts and step/spacer add-ons that allow the system to extend for example from about 84 inches for typical room construction using eight foot studs to 160 inches or more employing auxiliary spacer elements and threaded rod segment-coupler screws as needed. This expansion is enabled by the addition of spacer and functional elements to the column as shown for example by the addition of step, loft (35, 37, 44), spacer (38 or 41) and coupler-screw (33 or 43) elements.

Spacers (38, 41, 46) can be of any given length and need not be uniform though for practical production reasons it is preferred to have uniform spacers generally varying in length from about 3 inches to more than about 12 inches. Spacers between small and mid size steps are typically about 6 to 7.5 inches long. Spacers have an equilateral triangular cross-section naturally providing 120-degree rotational increments for rotational indexing of step and loft elements to make a spiral staircase and give a pleasing aesthetic appearance. Dowels (31, 36, 42, 47) of varying lengths are inserted between the steps, lofts, and spacers and provide lateral strength and allow for rotational indexing and added stability against rotational movement. Other forms of indexing the steps and the spacers such as tabs and grooves, ridges and channels and the like which are common in the art may also be utilized.

Figure 3:
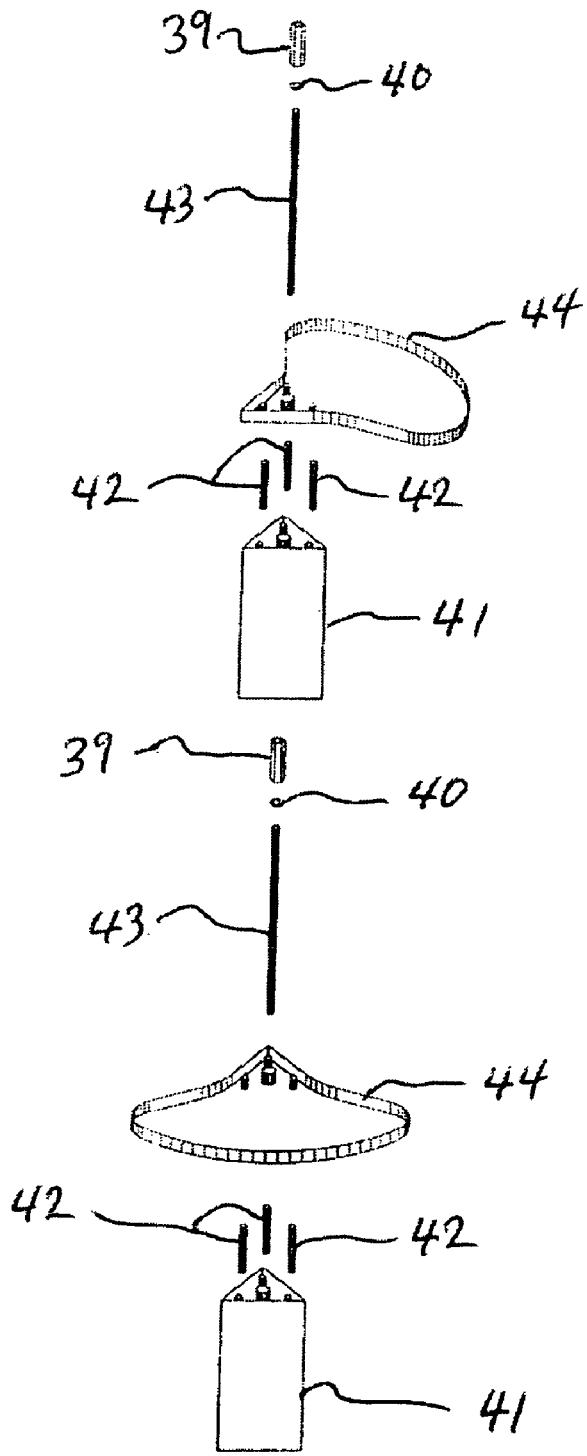
FIG. 3 shows details of modularity and automatic rotational indexing of steps by dowels at apexes.

FIG. 3 Shows a magnified view of the spacers, dowels, and coupler-screws. The triangular column shown in FIG. 3 is particularly suited functionally to facilitate assembly of the embodiment having stair treads spiraling about the column at 120 degrees of arc, each spacer and a matching triangular insert portion of each stair tread can conveniently be fitted with dowel receiving holes or other indexing means, whereby in assembly each tread is simply rotated 120 degrees from the previous tread with the indexing means uniformly in each apex of the triangle.

Figure 4:
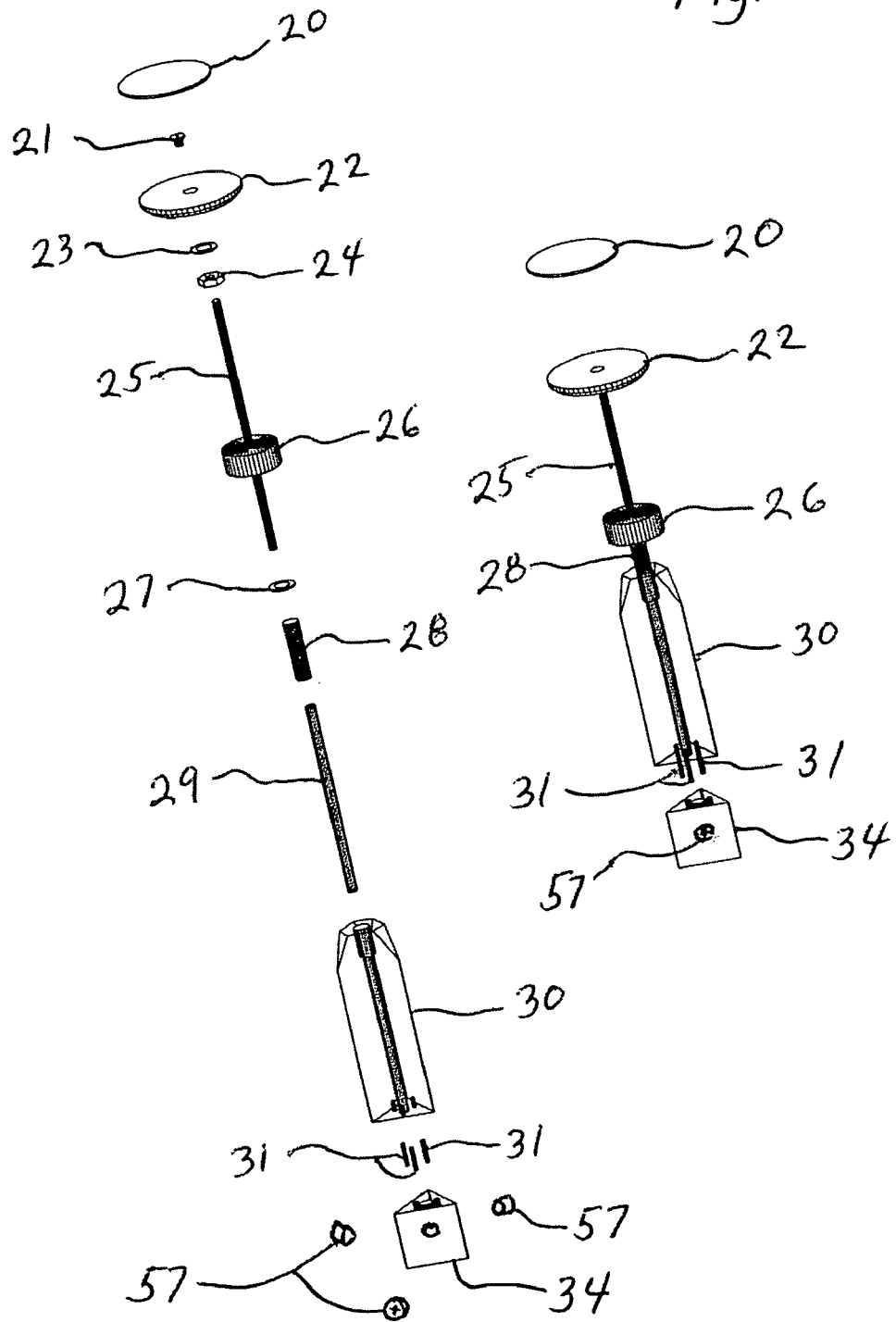
FIG. 4 shows individual components of the spring biased height adjustment system in exploded and assembled views.

FIG. 4 illustrates the separable fine adjustment system using cam-nut with cam-dowel connection to the base column and spring compression assembly that improves the stability of the column held between floor and ceiling by automatically compensating for variations in floor to ceiling distance that occur over time owing to settling, humidity changes and other changing conditions that result in minor expansions or contractions. The screw-jack housing (30) provides cavity and seat for the spring (28) that limits the force on the ceiling by only allowing half of the spring's force ("spring-rate") to be applied to the ceiling. The knob (26) compresses the spring (28) against the seat in the screw-jack housing and raises the sizing screw (25), ceiling disk (22), and friction pad (20) against the ceiling as it is tightened. The sleeve (29) provides a bearing surface for the sizing screw (25). The functional portion of the column of the invention including spacers and steps, lofts and the like, not including the jack screw spring assembly that is generally attached to the top of the column and the base platform generally attached to the bottom of the column, is held in compression by the core rod assembly comprised of rods externally threaded at both ends and internally threaded coupler-nuts with pin or equivalent (forming a coupler-screw) means to limit penetration depth from either side and means such as T-nuts for engaging the coupler screws with the upper and lower surfaces of the terminal spacers forming the column or separate columnar segment in the preferred embodiment employing a segmented threaded core rod and coupler-screws. The compression of the column elements provides rigidity and stability to the structure independent of any additional compressive force provided by the use of the spring device used in maintaining the entire structure fixed between floor and ceiling. The rigidity and both vertical and horizontal stability provided for the functional portion of the device by placing the main body of the columnar structure under compression is necessary in order to avoid excessive force being exerted on the floor and ceiling which permits the insertion of the device at any place in a room without regard to the limit the location to areas where the floor and ceiling directly above are both adequately reinforced to carry the force necessary to give the requisite strength to the functional portion of the column, e.g. the stability needed to allow for cats to spring from step to step in the case where the device is a spiral exercise staircase and loft for pet cats. Rotationally stability of the stair treads about the column but is provided by the axial compression core rod and indexing dowels. As an alternative to threaded rods one may use a tubular element with internal threading at the ends and an externally threaded screw with a sleeve or other limiting means to restrict the extent of penetration into the tube in joining separate sections to enable generating sufficient torque to create compression without allowing the coupler screw to be primarily or entirely engaged with only one of the mating rod or tube sections. The cam-nut and cam-dowel elements compressively join the base column with its step and loft elements to the adjuster assembly providing a rigid system from floor to ceiling.

FIG. 5 shows a magnified cut-away view of the top of the screw-jack housing (30), spring (28), "D" shaped sleeve (29), and "D" shaped sizing screw (25). The "D" shaped detail rotationally locks the ceiling pad to the column and simplifies ceiling adjustment. Section view A-A shows the fit of the "D" shaped sleeve in the screw-jack housing.

Figure 6:
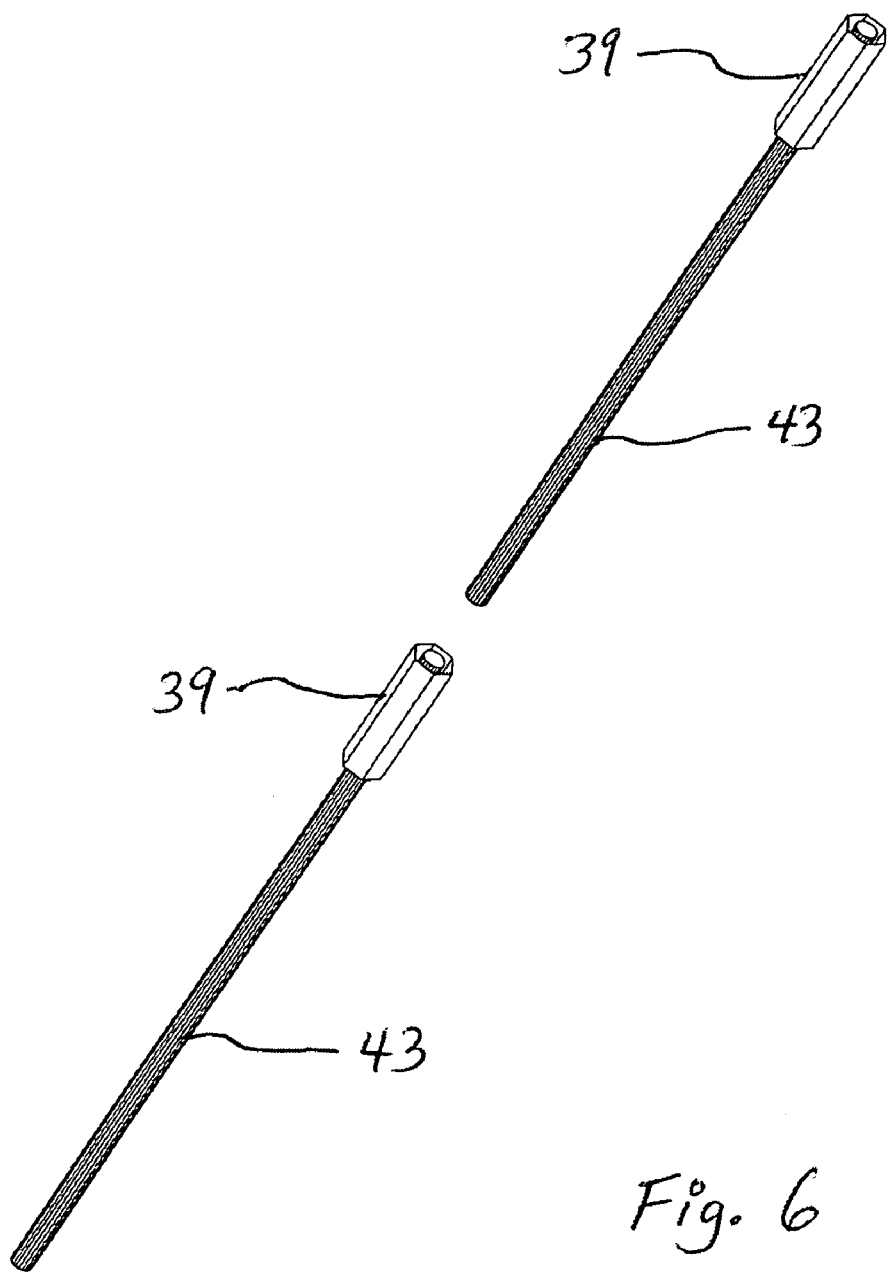
FIG. 6 shows a coupler-screw assembly formed by the fusion of a threaded rod and a coupler nut accomplished by welding, crimping, pinning, or deformation of threads.

FIG. 6 illustrates coupler-screws that compress the system. Multiple coupler-screws and threaded rods of varying lengths are used throughout the system to maximize compression and to provide shorter lengths for convenience in packaging and transport as well as for ease of assembly and storage. As the continuous core compression rod may be comprised of one or more rod sections with terminal cap nut securing the entire functional section of column under compression it will be understood that in the case where the core rod is composed of multiple rod segments mated end to end with coupler screws the rod segments are of sufficient length to span at least two spacer or functional elements preferably two or more spacers with at least one functional element sandwiched between. It will be appreciated that for each length of core compression rod the coupler screws are axially engaged with the terminal ends of the spacers or functional elements, such as stair treads, to exert an intermediate compressive force with the full force on the entire functional column section being determined by cap screws (or T-Nuts) at the extreme ends of the combined rod engaged with the terminal ends of the spacers and functional elements comprising the main columnar assembly but excluding the base platform assembly and jack screw spring assembly cap and column.

Figure 7:
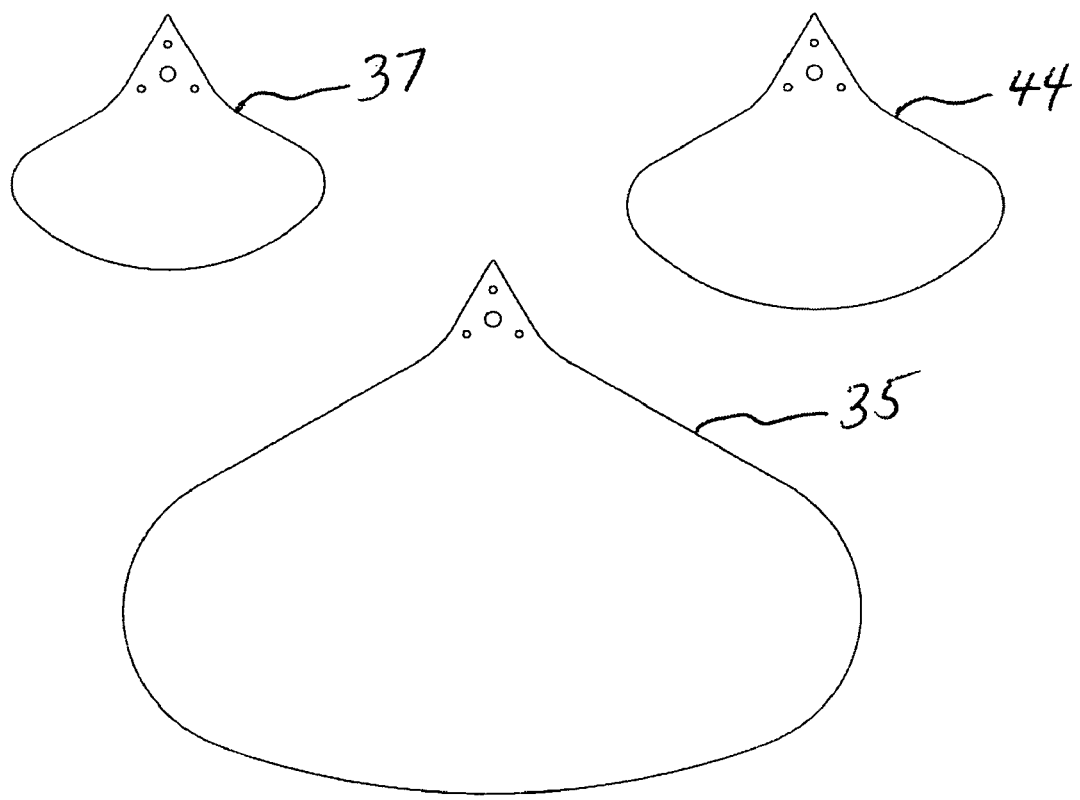
FIG. 7 shows the comparative sizes of the steps and loft(s). Only three sizes are shown, but versions with a greater variety of individually sized steps are permitted for improved appearance.

FIG. 7, elements 35, 37, and 44 illustrates the relative difference in size of the steps and loft platforms. To allow for minimum floor space utilization the lower several steps, e.g., about six are smallest shown as element 37 and form the overall diameter of the assembled system for the first several feet of elevation allowing occupants to utilize space under the upper steps and loft(s) for improved movement or furniture placement within a room. Smaller steps (37) may also be used as stiffeners for reinforcement under the larger steps and the lofts to provide added strength to reduce flexing under load.

Figure 8A:
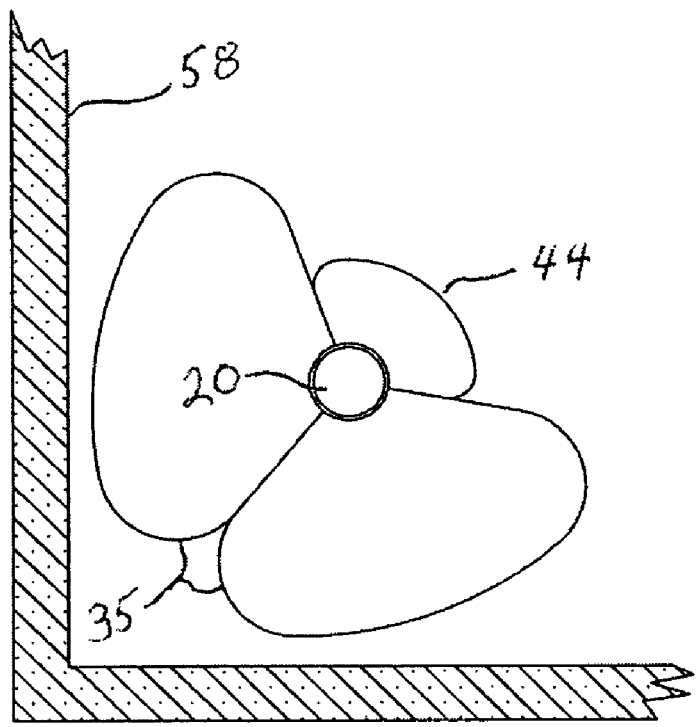
FIGS. 8A and 8B shows two top-down views of the loft system positioned close to the corner of a room. 8A shows a two loft version, while 8B shows a single loft version.
Figure 8B:
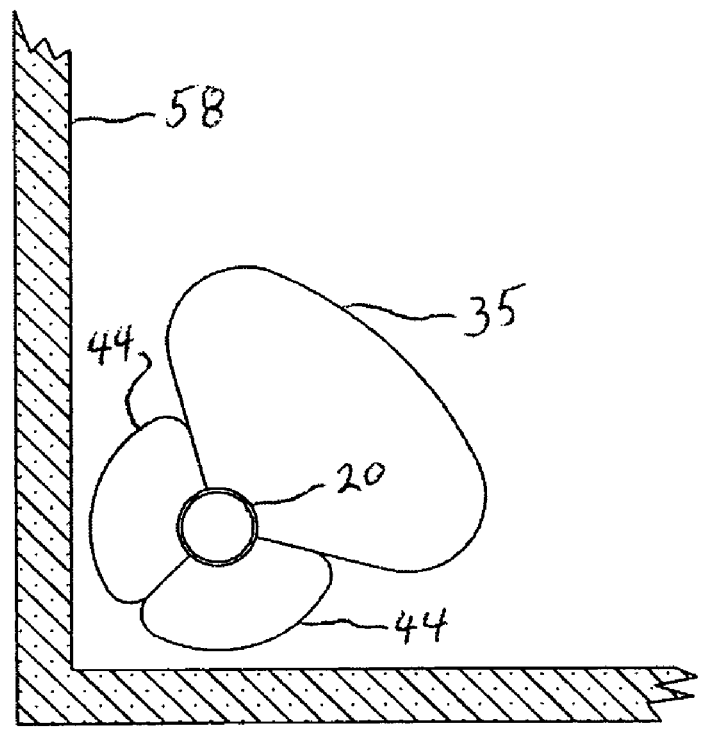

FIGS. 8A and 8B illustrate top views of the system with single and dual lofts. FIG. 8A shows the distance from a corner required by the dual loft system and FIG. 8B shows a closer fit to a room's corner.

Figure 9:
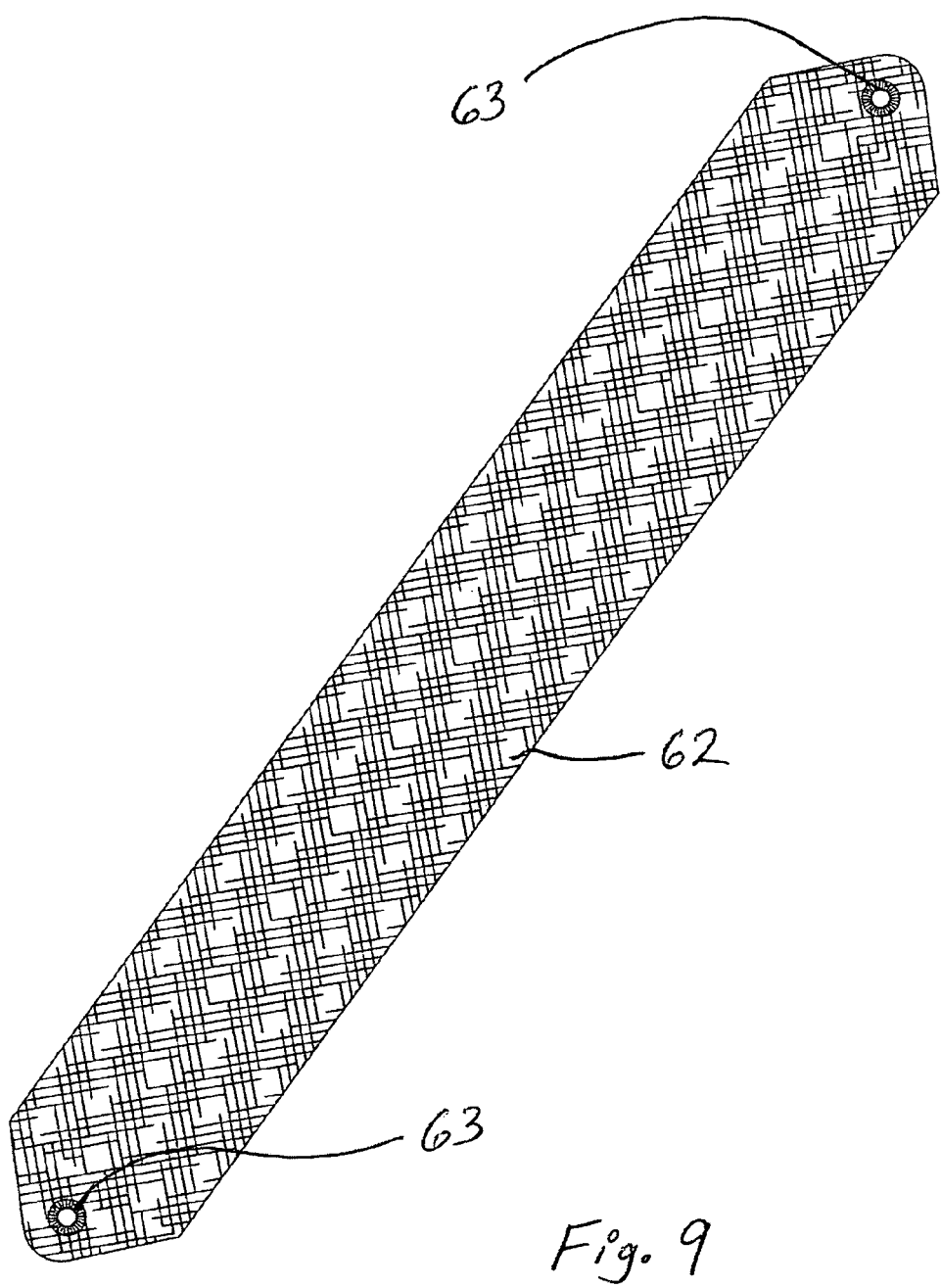
FIG. 9 shows the shape of the scratch pad and its mounting holes.

FIG. 9 Shows the removable scratch pad (62). Its v-shaped ends and grommets (63) distribute the scratching forces evenly. Knurled thumb screws are used for easy removal and reinstallation for cleaning.

FIG. 10 shows step and loft features FIG. 11 shows an illustrative shape of steps carpet, and loft. It will be obvious that other, preferably aesthetically pleasing designs may be utilized

FIGS. 8A—Additional Embodiments

FIG. 8A illustrates a two loft version to accommodate two cats simultaneously. A third loft can easily be added as needed using the same components.

The loft platforms may be used together as shown in 8A, or separated by additional spacers and steps to provide perch areas at multiple elevations with narrow step platforms between the larger lofts.

An elongated step or loft platform with the hub connection detail on opposite ends can be used to connect two adjacent free standing systems together thereby increasing the step and perch area for multiple animals.

FIGS. 12-15—Alternative Embodiments

There are various possibilities with regards to materials and cross-sectional design of the spacer elements and method of joining them to their respective steps or loft(s).

FIG. 12 illustrates the use of plastic pipe (53) as spacers with integral tabs (54) and steps with socket holes (52) to provide indexing and improved lateral strength. The tab feature could also be integrated in a flange that attaches as a pipe fitting to the end of a tube that is cut even for ease of manufacture.

FIG. 13 shows a one-piece step/spacer element (55) with integral keyed mating features (72,73). This one-piece step/spacer can be produced using molding or composite techniques. The key and keyway can be produced with or without bayonet latch pin/socket details. This alternate embodiment shares the coupler-screw and spring loaded screw-jack features to provide rigidity, adjustability and automatic compensation for changes in ceiling or flooring materials. In preferred embodiment of the cat staircase the semi-circular Gingko shaped steps encompassing 120 degrees and lofts are used as a commonality between various embodiments.

FIG. 14 shows a hollow triangular spacer and its integral ribs that locate dowels and the adjuster spring.

Steps, lofts, and spacers may also be made from various materials beyond wood and plastics using different processes. In our preferred embodiment the spacers are produced as extruded triangular plastic components preferably polyvinyl-chloride extrusions with integral indexing elements.

The adjuster mechanism can be driven by a worm and spur gear or planetary gear system driven by a hex wrench (or similar) in place of the adjusting knob.

Still other variations and optional items such as compressible spacers, feeding bowl supports, detachable cushions for the lofts and similar alternative structural and related ancillary features may be incorporated.

FIG. 15 shows an alternate method of mounting steps to enable adjustable tilting of the steps. The adjustable step mount (74) is compressed between adjacent spacers (41) and attached to the adjustable step bracket (75) using a pivot fastener and washer (77,40). The pivotable step is mounted to the top of the adjustable step bracket (75) and the angle of the step is adjusted by loosening and tightening the pivot fastener (77). Tilting the steps improves ascent and decent efficiency for cats with claws.

Advantages

From the description above, a number of advantages of my exercise and perch system become evident:

a A retail package that is less than 30 inches long by 20 inches wide and 5 inches thick contains an entire unit. Whereas competing devices occupy more than twice this volume in shipment and in store displays.

b This is the only device of its type that maintains an automatic and safe pressure on its support floor and ceiling surfaces.

c Floor space is conserved for occupants, and cats are provided additional safety as height increases.

d The device can be moved at will by uncompressing the spring or disassembled for shipment and have sections added or removed to conform to new homes as the owner needs.

e Steps that encompass a 120 degree arc allow for faster ascent and descent since more degrees are navigated with fewer step changes in each 360 degree revolution.

f Styling is more contemporary than traditional carpet or rope covered cylinders that use carpet covered particle board steps and lofts.

g Using multiple coupler-screw sections and index dowels or tabs improves rigidity of the post system. Using a greater number of rods allows for more effective joining of individual sections and results in a minimal loss of compression efficiency.

h The sleeve tube that extends through the center of the spring maximizes useable safe extension of the sizing (adjustment) screw, improves the stability of the assembled system, and resists rotation.

i The semicircular shape of the steps and loft(s) allows the device to be located nearer to corners than other systems that use square or rectangular steps.

j The device is free standing and can be located anywhere in a room and doesn't require fasteners to maintain its position or security.

Operation—FIGS. 1-4

The assembly of the individual components and the locations of the index dowels is shown in FIG. 1 and magnified in FIGS. 2, 3, and 4.

FIG. 4 illustrates the assembly of the adjusting components that places the system in active compression between the ceiling and the floor.

The consumer assembles section by section adding each spacer, dowels and steps one at a time. From the bottom and working upward. Each new step installs with a 120 degree offset maintained by the dowels (or tabs) and then is secured in place by a coupling-screw to receive the next group of spacers, dowels and steps or lofts, etc. . . . When fully assembled the unit is raised in its desired location and the knob is tightened compressing the spring causing adhesion to the ceiling.

Conclusion, Ramifications, And Scope

Accordingly, the reader will see that this exercise and perch system provides a unique scalable structure for both the pet, and occupant of the household by creating easily accessed, and safe near-ceiling perch space while taking a minimum of floor space from the room, and doing so in an aesthetic manner. The device is extremely compact when disassembled. It can be packed in a low volume box for users that move frequently and retail outlets that need to maximize floor and shelf space within a store or warehouse. These features are made possible by:

- The use of semicircular steps which minimizes the overall diameter of the device allowing it to be located closer to corners.
- Graduation of the step radius, small near the bottom, and increasing with height maximizes floor space for the occupants and provides added safety for the cats as they approach the ceiling.
- The use of 120 degree rotational intervals allows for faster ascent and descent.
- "Multiply" plywood or composite materials provide needed stiffness while reducing manufacturing costs, complexity and maintaining a low shipping weight.
- The coupler-screw system in conjunction with the dowels (or tabs) creates a ridged post from a collection of individual components.
- The adjuster sizing mechanism provides ease of fine adjustment while protecting the ceiling from damage and automatically adjusting for changes in floor materials.

Thus the reader will see that the perch and exercise system of the invention provides a scalable, lightweight and economical device that can be transported, setup and installed by persons of almost any age.

While my above description contains many specificities these should not be construed as limitations on the scope of the invention, but rather as an exemplification of one preferred embodiment thereof. Many other variations are possible. For example: the spacers could be extruded in a hollow triangular form shown in FIG. 14 with positioning ribs on the inside at each apex forming integral dowel sockets and inside anti-flex ribs from the middle of each facet that provide additional lateral strength and act as a spring holding socket at the top of the adjuster mechanism.

Accordingly, the scope of the invention should be determined not by the embodiments illustrated, but by the appended claims and their legal equivalents.

I claim:

1. A readily assembled column structure comprising:
   multiple hollow rigid spacer members interspersed with one or more functional members, wherein the functional members are held firmly in compression between the spacer members by means of one or more compressive elements traversing the longitudinal axis of the hollow rigid spacer members and the functional members;
   fasteners releasably securing the terminal ends of the one or more compressive elements to the respective terminal ends of the spacer elements of the column in a manner that enables the entire column assembly of hollow rigid spacers and functional members to be compressed in order to provide rigidity and stability to the column;
   and a spring assembly attached to at least one end of said column and axially aligned with the column to allow for removably inserting the column between two fixed surfaces.

2. A column according to claim 1 wherein the confining one or more compressive elements is comprised of a multiplicity of compressive elements mated end to end, each compressive elements having an externally threaded end and secured to an internally threaded coupler-screw for receiving the threaded end of a successive rod with means for limiting the depth to which the rod may penetrate the coupler screw, said mated rods and coupler screws forming a continuous compressive element having fasteners at both ends adapted for releasably engaging the terminal spacers or functional elements of the column and securing the entire column under compression.

3. A column according to claim 2 wherein one terminal spacer has attached thereto a platform element at the bottom of the column and the other end has attached there to an anti-rotational jack screw spring assembly defining the top for adjustable insertion between floor and ceiling.

4. A column according to claim 3 wherein the functional elements are stair treads and loft platforms protruding perpendicular to the axis of the column spaced equidistant along the column axis and at equal angular intervals around the column to provide a spiral cat climber.

5. A column according to claim 4 wherein one or more of the topmost functional elements are larger than the stair treads to provide a cat loft or perch.

6. A column according to claim 5 wherein the stair treads and perch upper surface areas are carpeted.

7. A column according to claim 5 wherein the perch areas are adapted to hold a detachable pillow.

8. A column according to claim 5 wherein the cross section of the column is triangular or polytriangular.

9. A column according to claim 5 wherein the spacer members and treads members defining the column are solid material having an axial hole the entire length of the column sized for one or more compressive elements to fit tightly therein with enlargements to accommodate the coupler screws.

10. A column according to claim 5 wherein the spacer members and tread members are molded plastic.

11. A cat climbing and perching device comprising a spiral cat staircase having a segmented central core rod joined by coupler screws confining a vertical stack of spacer elements interspersed with horizontal stair treads, said stack held under compression by threaded elements affixed to the terminal ends of the central core rod, a top spring loaded jack screw assembly and a bottom base plate assembly.

12. The device in claim 11 wherein the column has a triangular cross section.

13. The device of claim 12 wherein the stair treads are non-rotatably locked to the adjacent spacer elements.

14. The device of claim 13 wherein the treads are of increasing size at higher elevations.

15. The device of claim 14 wherein the stair tread mounting is an angularly adjustable bracket.

* * * * *